United States Patent
Haustein et al.

(10) Patent No.: US 7,539,710 B1
(45) Date of Patent: May 26, 2009

(54) METHOD OF AND SYSTEM FOR DEDUPLICATING BACKED UP DATA IN A CLIENT-SERVER ENVIRONMENT

(75) Inventors: Nils Haustein, Soergenloch (DE); Craig A. Klein, Tucson, AZ (US); Ulf Troppens, Mainz (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/101,541

(22) Filed: Apr. 11, 2008

(51) Int. Cl.
*G06F 17/30* (2006.01)
(52) U.S. Cl. ..................................... 707/204
(58) Field of Classification Search ........................ None
See application file for complete search history.

(56) References Cited

U.S. PATENT DOCUMENTS

| | | | |
|---|---|---|---|
| 6,931,422 B1 | 8/2005 | Gusler et al. | |
| 7,103,602 B2 | 9/2006 | Black et al. | |
| 2005/0158028 A1* | 7/2005 | Koba | 386/69 |
| 2007/0255758 A1 | 11/2007 | Zheng et al. | |
| 2008/0005201 A1 | 1/2008 | Ting et al. | |
| 2008/0133446 A1* | 6/2008 | Dubnicki et al. | 707/1 |
| 2008/0184001 A1* | 7/2008 | Stager | 711/167 |

OTHER PUBLICATIONS

NETAPP White Paper, "Looking Beyond the Hype: Evaluating Data Deduplication Solutions," Larry Freeman, Network Appliance, Inc., Sep. 2007|WP-7028-0907.

* cited by examiner

*Primary Examiner*—John Cottingham
*Assistant Examiner*—Kimberly Lovel
(74) *Attorney, Agent, or Firm*—Dillon & Yudell LLP

(57) ABSTRACT

In a method of and a system for deduplicating backed-up data backup clients create respective backup tables comprising a list of files and respective file types to be backed up. A backup server receives backup tables from the backup clients. The backup server merges the received backup tables to form a merged backup table. The backup server sorts the merged backup table according to file type from a file type yielding a best deduplication ratio to a file type yielding a worst deduplication ratio, thereby forming a sorted backup table. The backup server requests the files listed in the sorted backup table, in order, from the backup clients. The backup server deduplicates files received from the backup clients, in order, using deduplication parameters optimized according to file type. The method calculates an updated deduplication ratio for each deduplicated file type. Examples of deduplication parameters include chunking techniques and hashing techniques.

1 Claim, 6 Drawing Sheets

METHOD OF AND SYSTEM FOR DEDUPLICATING BACKED UP DATA IN A CLIENT-SERVER ENVIRONMENT

BACKGROUND OF THE INVENTION

1. Technical Field

The present invention relates in general to the field of computer file backup, and more particularly to a method of and system for deduplicating data backed up in a client server environment.

2. Description of the Related Art

Computer data is a vital asset to most businesses and other organizations. Data may become lost through equipment failures, human errors, or by many other causes. Loss of data can severely impact the operations and success of an organization.

Most organizations attempt to reduce the likelihood of losing data by periodically backing up their data by transferring copies of the data to another system. The backup system may be at a different physical location from that of the original data. Many backup facilities receive data from several physically separate systems over networks. If an organization loses data locally it can have the lost data restored from the backup system.

Backup systems typically have a tremendous amount of data. Backup systems desire to reduce the amount of space required to store the data. One method of reducing required storage space is data deduplication. In data deduplication, a data object, which may be a file, a data stream, or some other form of data, is broken down into one or more chunks using a chunking method. A hash is calculated for each chunk using any of several known hashing techniques. The hashes of all chunks are compared for duplicates. Duplicate hashes mean either the data chunks are identical or there has been a hash collision. A hash collision occurs when different chunks produce the same hash. To prevent hash collisions, other techniques such as bit-by-bit comparison may be performed. After the comparison of hashes and proof of their uniqueness, unique chunks are stored. Chunks that are duplicates of already stored chunks are not stored; rather, such chunks are referenced by pointers to the already stored chunks.

Data deduplication can yield storage space reductions of 20:1 or more. However, the deduplication ratio is highly dependent upon the method used to chunk the data. Several chunking techniques have been developed. Each chunking method is thought to be optimum for a set of file types. However, a particular chunking method may not in fact be optimum for a particular file type. Data deduplication consumes a fair amount of processing power and time. Since backup systems have so much data to deduplicate, it is important to deduplicate the data as efficiently as possible.

SUMMARY OF THE INVENTION

The present invention provides a method of and a system for deduplicating backed-up data. Backup clients create respective backup tables comprising a list of files and respective file types to be backed up. A backup server receives backup tables from the backup clients. The backup server merges the received backup tables to form a merged backup table. The backup server sorts the merged backup table according to file type from a file type yielding a best deduplication ratio to a file type yielding a worst deduplication ratio, thereby forming a sorted backup table. The deduplication ratios associated with deduplication parameters for file types may be stored in a table of deduplication parameters. The backup server requests the files listed in the sorted merged backup table, in order, from the backup clients. The backup server deduplicates files received from the backup clients, in order, using deduplication parameters optimized according to file type. The method may calculate an updated deduplication ratio for each deduplicated file type and update the deduplication ratio for each deduplicated file type in the table of deduplication parameters. Examples of deduplication parameters include chunking techniques, hashing techniques, and hash collision resolution techniques.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figures 1, 2:
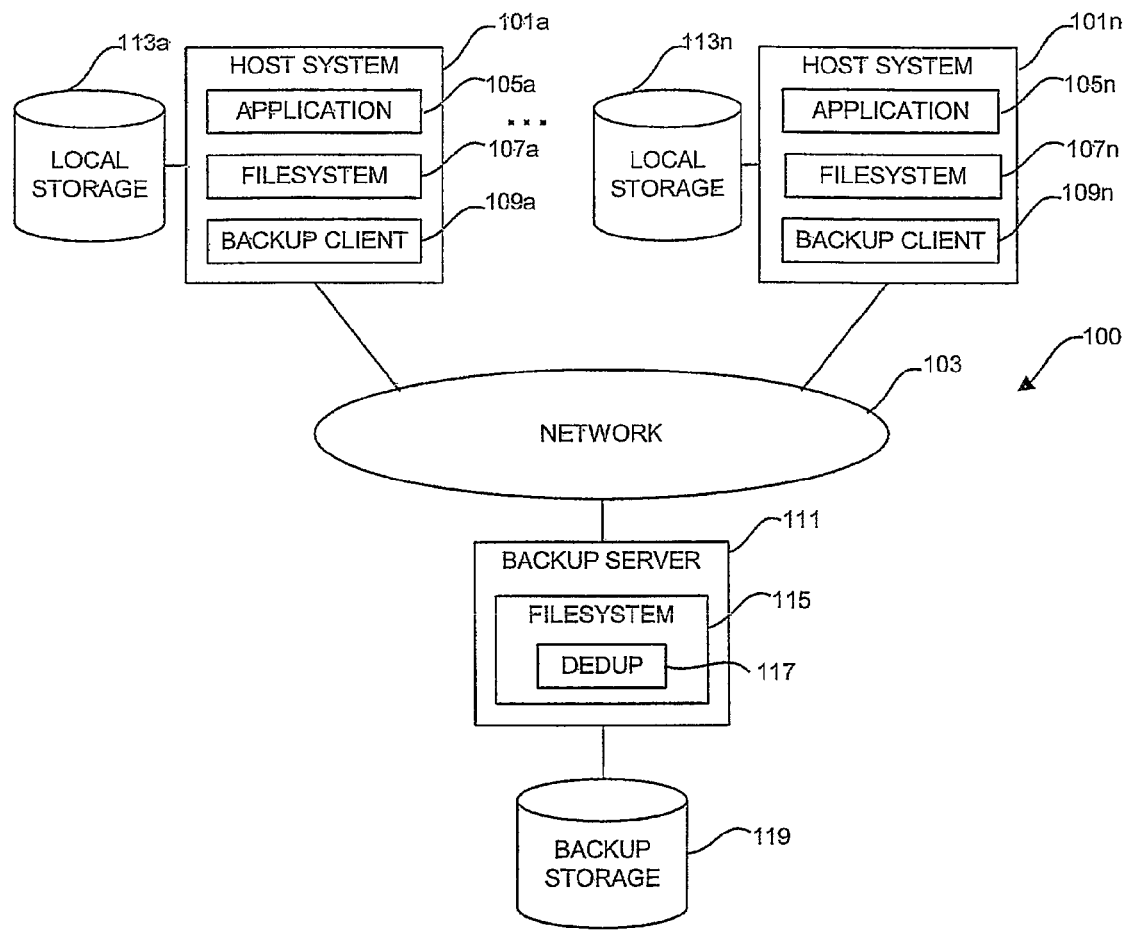
FIG. 1 is a block diagram of an embodiment of a system according to the present invention.
FIG. 2 illustrates an embodiment of backup client backup table according to the present invention.

Referring now to drawings, and first to FIG. 1, an embodiment of a system according to the present invention is designated generally by the numeral 100. System 100 includes a plurality of host systems 101 coupled to a network 103. Each host system 101 includes one or more applications 105, which may be text processors, databases, or other repositories managing images, documents, video streams, or any other kind of data. Each host system 101 includes a filesystem 107, which manages data files for host system 101. Each host system 101 also includes a backup client which cooperates with a backup server 111 coupled to network 103 to backup files stored in local storage 113 associated with each host system.

Backup server 111 includes a filesystem 115, which manages data files for backup server 111. Filesystem 115 includes a deduplication component 117 according to the present invention. Data of filesystem 115 is stored in backup storage 119, which may be disk storage or the like. Periodically, backup clients 109 backup files stored in respective local storage 113 of each host system 101 to backup server 111. Deduplication component 117 performs deduplication according to the present invention and stores the deduplicated files in backup storage 119.

FIG. 2 illustrates an embodiment of a backup client backup table 201 according to the present invention. Backup table 201 includes a filename column 203, a file type column 205, and a location column 207. As will be explained in detail hereinafter, each time a host system 101 creates a file identified by filename, its backup client 109 creates an entry for the file in backup table 201. Backup client 109 determines the file type for a file with reference to the file's filename extension. As is known to those skilled in the art, files with file name extensions of .ppt are PowerPoint™ files, .doc are Word™ files, etc. The location where a file is stored in local storage 113 is noted in location column 207. Whenever a host system 101 moves or copies a file stored in local storage 113, backup client 109 updates backup table 201 with a new location for the file. Whenever a host system 101 deletes a file, backup client 109 deletes the entry in backup table 201 for the deleted file.

Figure 3:
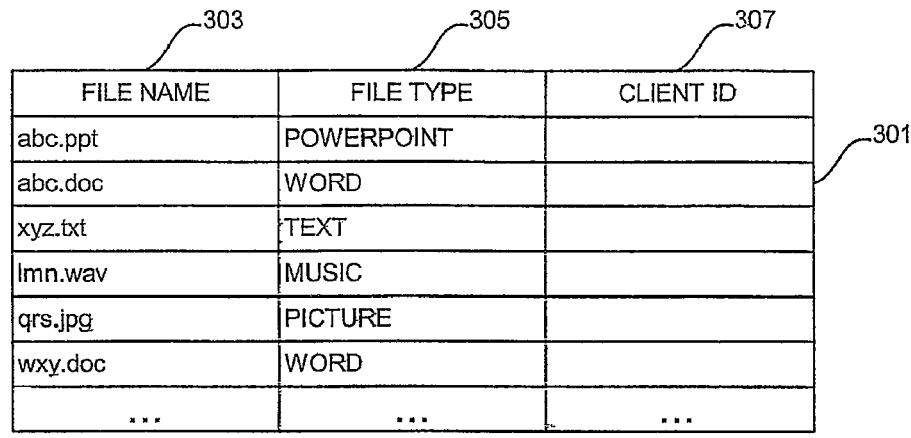
FIG. 3 illustrates an embodiment of a backup server merged backup table according to the present invention.

As will be explained in detail hereinafter, as part of the backup process according to the present invention, backup server 111 periodically requests each host system 101 to send to backup server 111 a copy of its backup table. As will further be explained in detail hereinafter, backup server 111 merges the backup tables received from backup clients 101 into a backup server merged backup table. An example of a backup server merged backup table 301 is illustrated in FIG. 3. Merged backup table 301 includes a filename column 303, a file type column 305, and a client ID column 307. Client ID identifies files belonging to host systems 101.

As a further part of the backup process according to the present invention, backup server 111 sorts the entries in merged backup table 301 by file type from the file type yielding the best deduplication ratio to the file type yielding the worst deduplication ratio. Deduplication ratio is a measure of the efficiency of a deduplication method. A deduplication ratio for a file is calculated by dividing the space that would be required to store the original file by the space required to store the deduplicated file. The deduplication ratio for files of a particular type is determined primarily by the chunking method used during the deduplication process. However, the hashing method and the hash collision resolution method used during the deduplication also have an effect upon the deduplication ratio.

Figure 4:
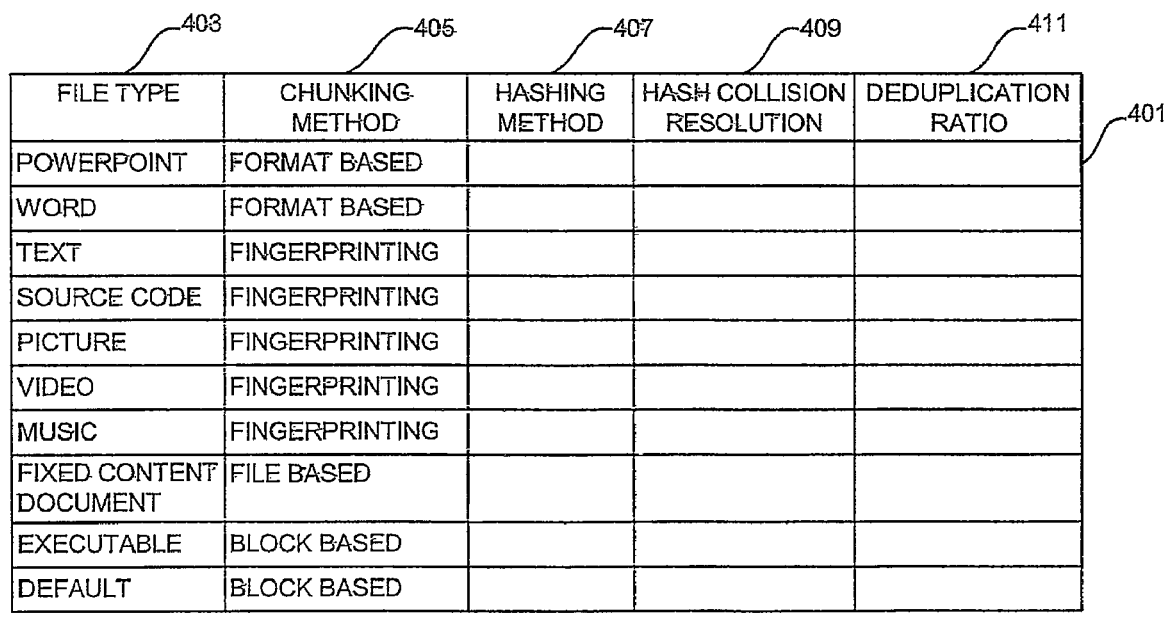
FIG. 4 illustrates an embodiment of a deduplication parameters table according to the present invention.

Generally, there is a particular chunking method that yields the best deduplication ratio for a particular type of file. FIG. 4 illustrates an embodiment of a table 401 of deduplication parameters according to the present invention. Deduplication parameter table 401 includes a file type column 403, a chunking method column 405, a hashing method column 407, a hash collision resolution method column 409, and a deduplication ratio column 411. The chunking methods in column 405 include format aware or format based, fingerprinting, file based, and block based. Format based chunking methods understand the data formats of data files of a particular type and break up the data based upon its format. Fingerprinting chunking methods look for logical breaks in the data and break up the data into chunks based upon the logical breaks. In file based chunking, the entire data file is an entity and is not broken down. In block based chunking, data files are broken down into fixed blocks. Backup server 111 uses the information in deduplication parameter table 401 in connection with sorting the files in merged backup table 301.

Figure 5:
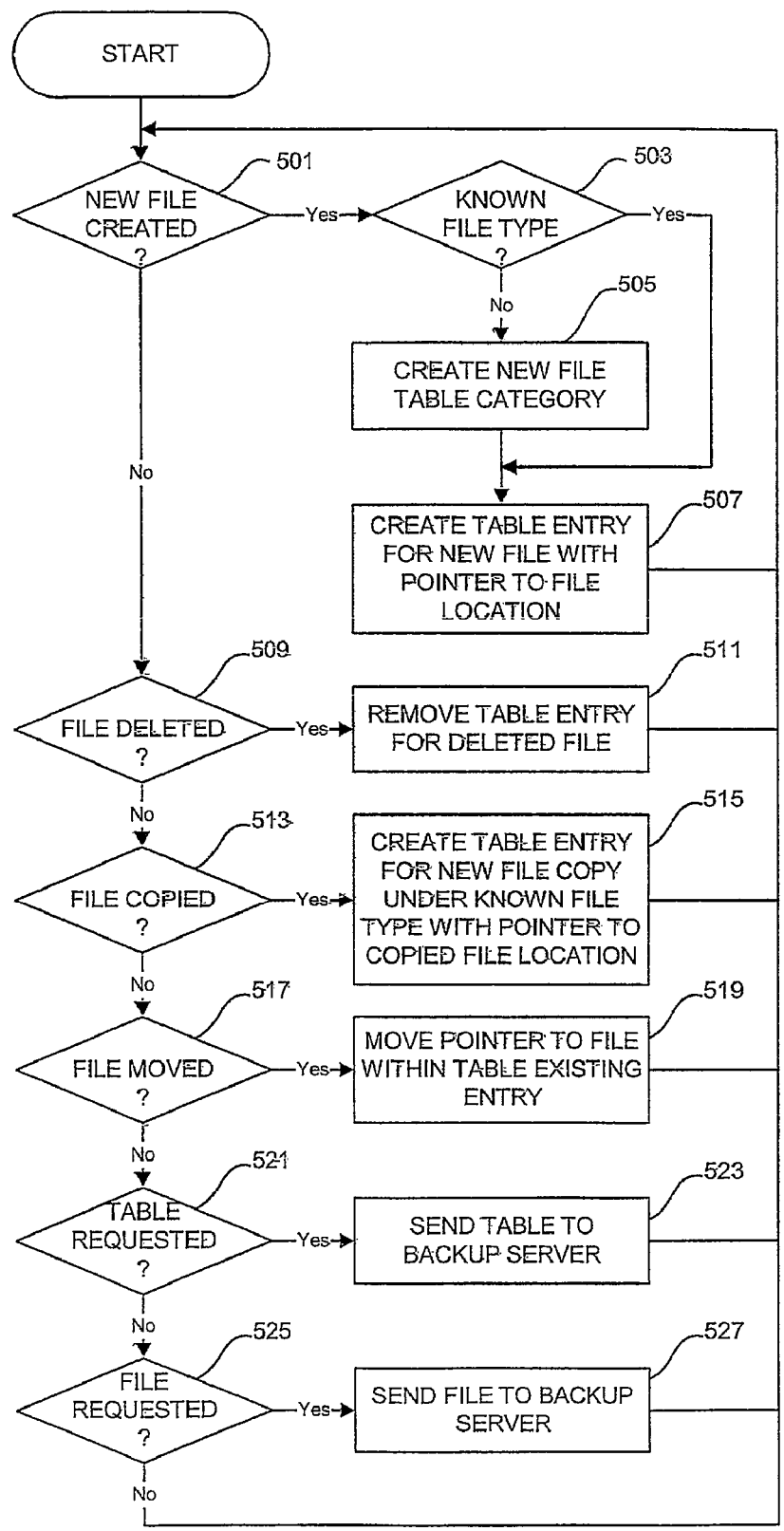
FIG. 5 is a flow chart of an embodiment of backup client processing according to the present invention.

FIG. 5 is a flow chart of an embodiment of backup client processing according to the present invention. The backup client monitors filesystem activity. When the backup client determines, at decision block 501, a new file has been created, the backup client determines if the newly created file is a known file type, at decision block 503. A known file type is one that is already used in the table of file types, such as client backup table 201 of FIG. 2. If not, the backup client creates a new file type category used in column 205 of table 201, at block 505. Then, the backup client creates a backup table entry for the new file (column 203 of table 201) with a pointer to its location (column 207 of table 201), at block 507, and processing returns to decision block 501. If, as determined at decision block 501, a new file has not been created, the backup client determines, at decision block 509, if a file has been deleted. If so, the backup client removes the backup table 201 entry row for the deleted file, as indicated at block 511. If, as determined at decision block 509, a file has not been deleted, the backup client determines, at decision block 513, if a file has been copied. If so, the backup client creates a new table entry for the new copy of the file with a pointer to its location, as indicated at block 515. If, as determined at decision block 517, the backup client determines that a file has been moved, the backup client updates the location pointer in the backup table (column 207 of table 201) to the file's new location. If, as determined at decision block 521, the backup server requests the backup table from the backup client, the backup client sends the backup table (such as backup table 201) to the backup server, at block 523. If, as determined at decision block 525, the backup server requests a file, the backup client sends the requested file to the backup server, at block 527.

Figure 6:
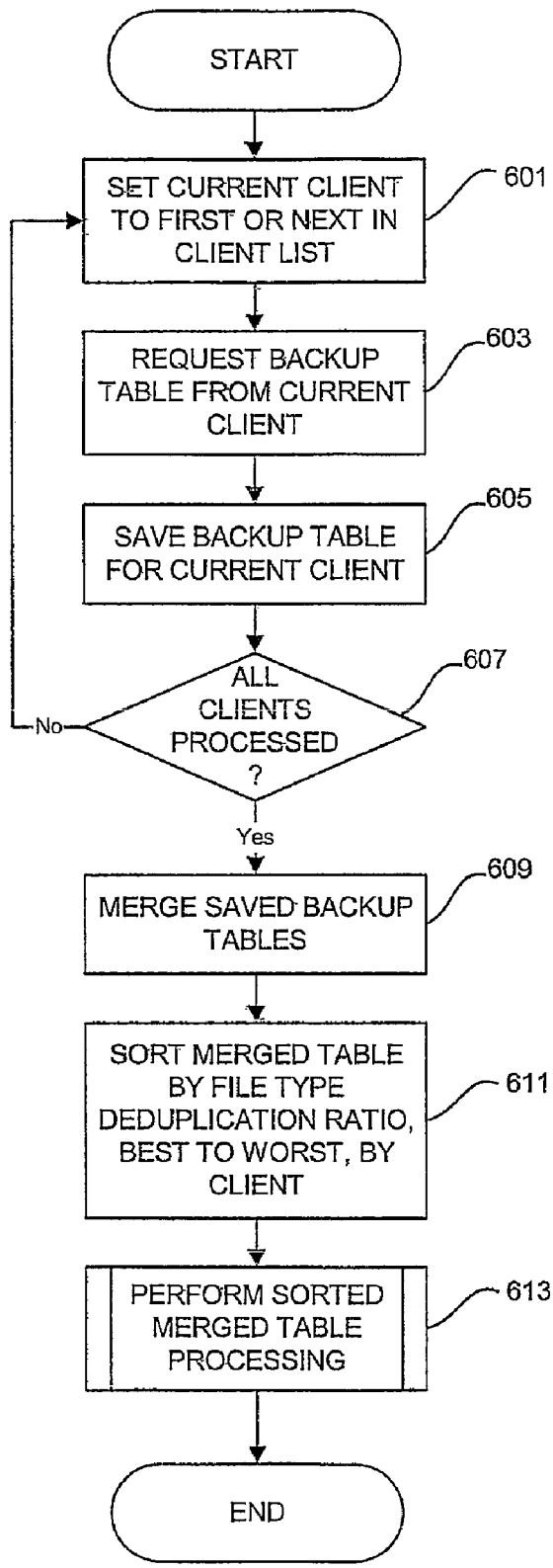
FIG. 6 is a flow chart of an embodiment of backup server backup table merging and sorting according to the present invention.

FIG. 6 is flow chart of an embodiment of backup server backup table request, merge, and sort processing according to the present invention. The backup server sets a current client to the first or next client in its list of clients, at block 601. The backup server requests the backup table, such as client backup table 201, from the current client, at block 603, and saves the backup table received from the current client, at block 605. The backup server determines, at decision block 607, if all clients have been processed. If not, processing returns to block 601. If, as determined at decision block 607, all clients have been processed, the backup server merges the saved backup tables to form a merged backup table such as table 301, at block 609. Then, the backup server sorts the merged table by file type, from best deduplication ratio to worst deduplication ratio, and by client ID, at block 611, using deduplication parameter and deduplication ratio information from a deduplication parameter table, such as table 401. Then, the backup server performs sorted merged table processing, as indicated generally at block 613. Embodiments of sorted merged table processing are described with reference to FIGS. 7 and 8.

Figure 7:
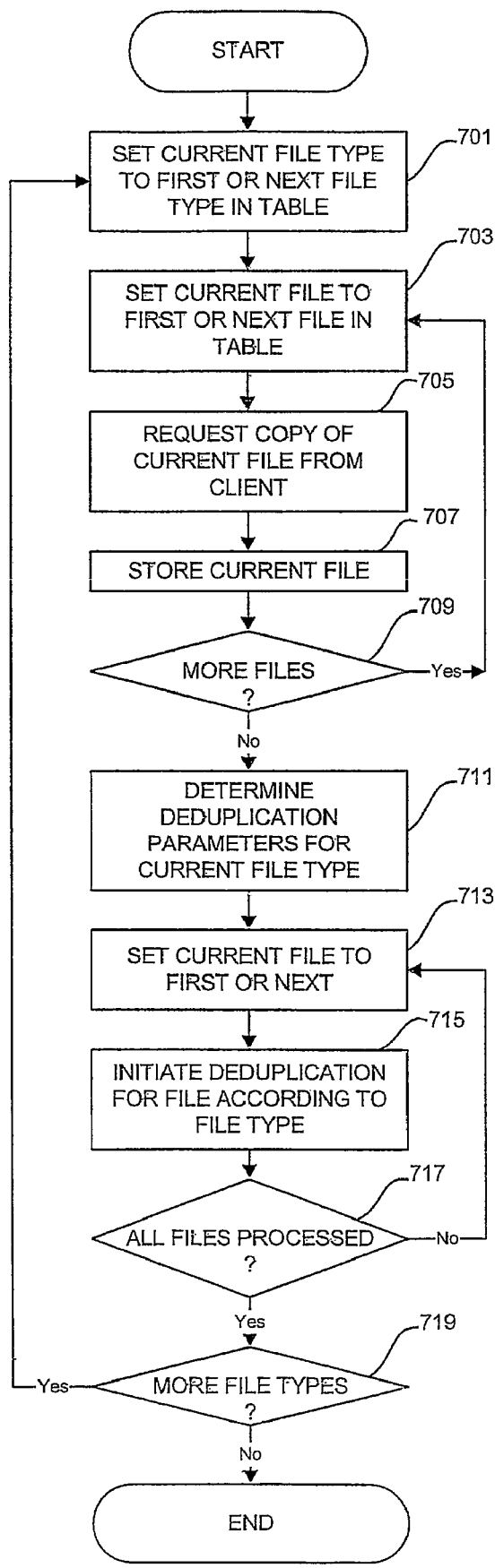
FIG. 7 is a flow chart of one embodiment of backup server deduplication processing according to the present invention; and, FIGS. 8A and 8B comprise flow charts of a second embodiment of backup server processing according to the present invention.

Referring to FIG. 7, the backup server sets current file type to the first or next file type in the sorted merged backup table, such as table 301, at block 701. Then the backup server sets current file to the first or next entry for the current file type in the sorted merged table, at block 703, and requests copies of all files having the current file type from all clients, at block 705. The backup server stores copies of the files received from the client, at block 707, and determines, at decision block 709, if all files listed in the sorted merged table of the current file type have been received. If not, processing returns to block 703. The backup server loops through blocks 703-709 until all files of the current file type have been requested and received.

After determining, at decision block 703, that all files of the current file type have been received, the backup server determines the deduplication parameters for the current file type, at block 711. The determination of deduplication parameters may be made with reference to a table of deduplication parameters, such as table 401. The backup server sets the current file to first or next, at block 713. Then, the backup server initiates deduplication for the current file according to its file type and deduplication parameters, at block 715. After deduplicating the current file, the backup server determines, at decision block 717, if all files of the current file type have been deduplicated. If not, processing returns to block 713. The backup server loops through blocks 713-715 until, as determined at decision block 717, all files of the current file type have been deduplicated, using optimized deduplication parameters.

When all files of the current file type have been deduplicated, the backup server determines, at decision block 719, if there are more file types in the sorted merged backup table. If so, processing returns to block 701. If not, processing ends. Thus, processing according to FIG. 7 continues until all files have been deduplicated and backed up.

The synchronized sending of files which have the same file type from all backup clients to the backup server sets the stage for very effective deduplication processing. The assumption is that files which have the same file type have a higher likelihood for duplicate data than files with different file types. Hence, the sorting of the merged table in step 611 and the request of files which have the same file type in steps 701 to step 709 fills the backup storage with data which can be efficiently deduplicated in steps 713 to 717.

Figure 8A:
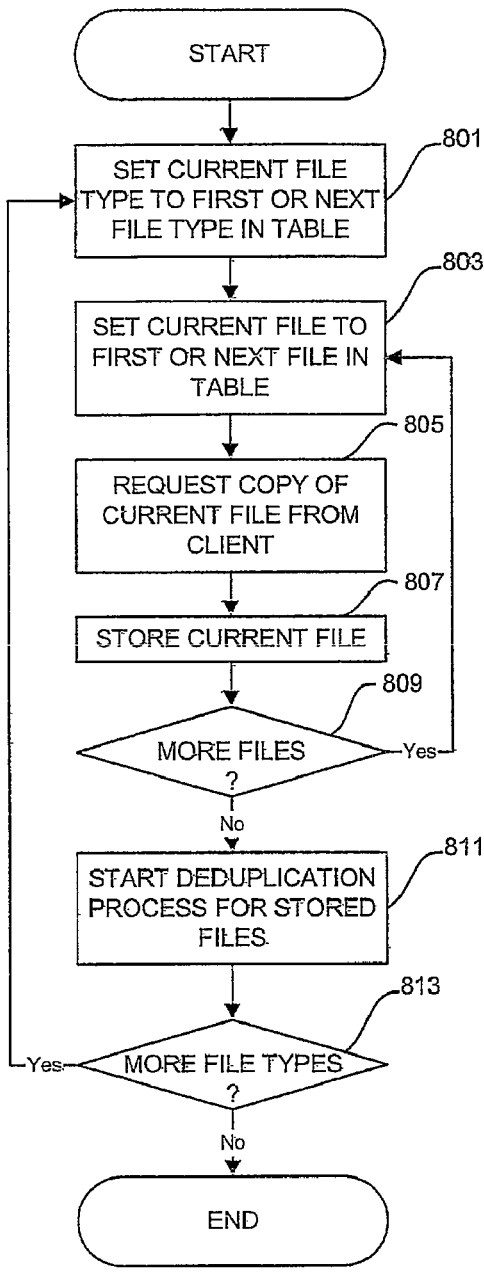
Figure 8B:
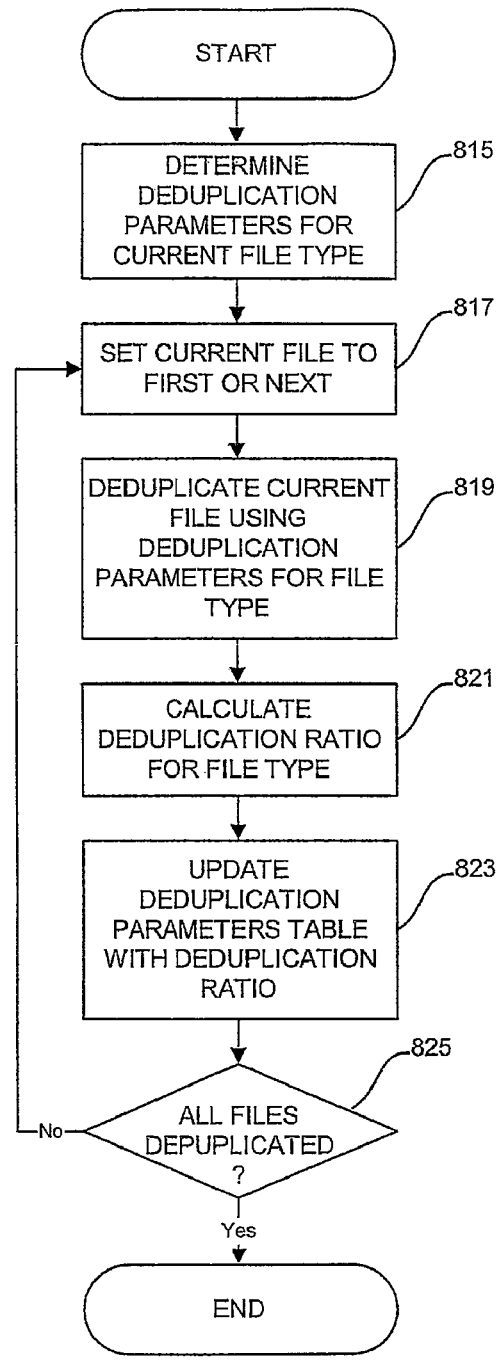

Referring now to FIGS. 8A and 8B, there is illustrated a second embodiment of backup server sorted merged backup table processing according to the present invention. The backup server sets current file type to the first or next file type in the sorted merged backup table, such as table 301, at block 801. Then the backup server sets current file to the first or next entry for the current file type in the sorted merged table, at block 803, and requests copies of all files of the current file from the client, at block 805. The backup server stores a copy of the file received from the client, at block 807. The copy of the current file may be stored in a deduplication queue. After storing the files, the backup server determines, at decision block 809, if all files listed in the sorted merged table of the current file type have been received. If not, processing returns to block 803. The backup server loops through blocks 803-809 until all files of the current file type have been requested and received.

After the backup server has received all files of the current file type, the backup server starts a separate deduplication process for the stored files. An embodiment of a deduplication process is illustrated in FIG. 8B. After starting the deduplication process, the backup server determines, at decision block 813, if there are more file types in the sorted merged backup table, such as table 301. If so, backup server sorted merged backup table processing returns to block 801.

Referring to FIG. 8B, which illustrates an embodiment of an instance of a backup server deduplication process, the backup server determines the deduplication parameters for the current file type, at block 815. The determination of deduplication parameters may be made with reference to a table of deduplication parameters, such as table 401. The backup server sets the current file to the first or next file in its deduplication queue, at block 817. Then, the backup server initiates deduplication for the current file according to its file type and deduplication parameters, at block 819. After deduplicating all files having the current file type, the backup server calculates the deduplication ratio for the current file type, at block 821.

The backup server calculates the deduplication ratio for the file by dividing the space that would required in order to store the original file by the space required to store the deduplicated file. Then, the backup server calculates an average deduplication ratio for the file type by dividing the sum of the individual deduplication ratios achieved for files of that type by the number of files of that type deduplicated. After calculating the deduplication ratio for the file type, the backup server updates the deduplication parameters table, for example table 401, with the calculated average deduplication ratio, at block 823. Then, the backup server determines, at decision block 825, if files in its deduplication queue have been deduplicated. If not, processing returns to block 817. The backup server deduplication process of FIG. 8B continues until all files in the deduplication for the file type have been deduplicated. Then, the deduplication process ends.

The processes of FIGS. 8A and 8B may be implemented separately. The sorted merged backup table process of FIG. 8A proceeds independently of the deduplication process or processes of FIG. 8B. As soon as the process of FIG. 8A has stored all of the files of a particular file type in a deduplication queue, the backup server launches a deduplication process of FIG. 8B to deduplicate the files in the queue. While, the deduplication process of FIG. 8B is processing its queue of files of one file type, the process of FIG. 8A is requesting files of a different file type. The backup server may create separate deduplication queues for each file type and launch separate deduplication processes for each queue.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of deduplicating backed-up data, which comprises:
   creating a backup table at each of a plurality of backup clients, wherein each said backup table comprises a list of files and respective file types to be backed up;
   receiving at a backup server backup tables from said backup clients;
   merging at said backup server said received backup tables to form a merged backup table;
   sorting said merged backup table according to file type from a file type fielding a best deduplication ratio to a file type yielding a worst deduplication ratio to form a sorted backup table, wherein a deduplication ratio for an original file is calculated by dividing an amount of space that would be required to store said original file by an amount of space required to store a deduplicated version of said original file;
   requesting the files listed in said sorted backup table, in order, from said backup clients;
   deduplicating files received from said backup clients, in order, using deduplication parameters optimized according to file type, said deduplication parameters including a chunking technique, a hashing technique, and a hash collision resolution technique;
   calculating an average deduplication ratio for each deduplicated file type by dividing a sum of the individual deduplication ratios achieved for files of said each deduplicated file type by a number of the files of said each deduplicated file type; and
   updating the deduplication ratio for each deduplicated file type with said calculated average deduplication ratio.

\* \* \* \* \*